(12) United States Patent
Tegge, Jr. et al.

(10) Patent No.: US 7,221,874 B2
(45) Date of Patent: May 22, 2007

(54) FREE SPACE OPTICAL (FSO) DEVICE PROVIDING REMOTE CONTROL FEATURES AND RELATED METHODS

(75) Inventors: Edward Harris Tegge, Jr., Palm Bay, FL (US); Donald M. Ball, Palm Bay, FL (US)

(73) Assignee: Harris Corporation, Melbourne, FL (US)

( * ) Notice: Subject to any disclaimer, the term of this patent is extended or adjusted under 35 U.S.C. 154(b) by 661 days.

(21) Appl. No.: 10/673,997

(22) Filed: Sep. 29, 2003

(65) Prior Publication Data

US 2005/0069324 A1  Mar. 31, 2005

(51) Int. Cl.
*H04B 10/00* (2006.01)

(52) U.S. Cl. ............... 398/119; 398/123; 398/129; 398/131

(58) Field of Classification Search ............... 398/118, 398/119, 123, 124, 128–131
See application file for complete search history.

(56) References Cited

U.S. PATENT DOCUMENTS

| | | | | |
|---|---|---|---|---|
| 6,154,297 A | | 11/2000 | Javitt et al. .................. 359/152 |
| 6,271,953 B1 | | 8/2001 | Dishman et al. ............. 359/172 |
| 6,347,001 B1 | * | 2/2002 | Arnold et al. ............... 398/122 |
| 6,381,055 B1 | | 4/2002 | Javitt et al. .................. 359/159 |
| 6,452,145 B1 | | 9/2002 | Graves et al. ............ 250/201.9 |
| 6,464,364 B2 | | 10/2002 | Graves et al. ............... 359/846 |
| 6,498,668 B1 | * | 12/2002 | Korevaar ..................... 398/129 |
| 6,568,647 B2 | | 5/2003 | Graves et al. ............... 248/476 |
| 2002/0149811 A1 | * | 10/2002 | Willebrand ................. 359/110 |

OTHER PUBLICATIONS

*Deformable Mirrors Flex Low-Cost Potential*, Opto & Laser Europe, May 2001, available at www.optics.org.
*Free-space Data Links: Time for a Reality Check*, Opto & Laser Europe, Jun. 2002, available at www.optics.org.
*The AO-2000™ Free Space Optics Transmission System*, AOptix Technologies, May 2002.

* cited by examiner

*Primary Examiner*—Dalzid Singh
(74) *Attorney, Agent, or Firm*—Allen, Dyer, Doppelt, Milbrath & Gilchrist, P.A.

(57) ABSTRACT

A modular free space optical (FSO) communications device may include an optical relay (OR) module and a base module. More particularly, the OR module may include an OR housing and at least one OR device carried thereby. Further, the base module may include a base housing and at least one positioner carried thereby for providing relative movement between the base module and the OR module for optical beam aiming. The modular FSO communications device may also include a camera and a remote station interface connected to the at least one positioner for permitting remote optical beam aiming. Furthermore, the remote station interface may also be connected to the camera for permitting remote viewing.

36 Claims, 5 Drawing Sheets

FREE SPACE OPTICAL (FSO) DEVICE PROVIDING REMOTE CONTROL FEATURES AND RELATED METHODS

FIELD OF THE INVENTION

The present invention relates to the field of communications systems, and, more particularly, to free space optical (FSO) communications systems and related methods.

BACKGROUND OF THE INVENTION

Interest in free space optical (FSO) communications continues to grow as the demands for higher bandwidth and faster data rates continue to increase. Generally speaking, an FSO system includes a pair of optical transceivers spaced apart from one another that transmit information back and forth using optical (e.g., laser) transmissions. Optical transmissions provide a wider bandwidth than other wireless communications mediums, such as RF frequency signals. Moreover, optical signals can generally be more focused than RF signals, and are thus more difficult to intercept and less likely to cause interference with other transmissions.

Despite the advantages of FSO systems, one drawback they have with respect to RF transmission systems is that the optical transceivers have to be precisely aligned with one another to operate properly. This may be difficult to do when the optical transceivers are spaced a significant distance from one another, such as a few miles or more. Moreover, in a typical FSO system, the optical transceivers are fixed in place once aligned with one another. As such, they cannot be easily re-directed to communicate with other transceivers as can a directional RF antenna, for example.

Various attempts have been made in the prior art to provide more ready alignment of FSO optical transceivers. U.S. Pat. No. 6,381,055 to Javitt et al. discloses a system for aligning optical transceivers in which reflectors are positioned near each transceiver. The reflectors are used to calibrate, align, and/or re-align the transceivers by reflecting a beam of light back toward its source. A control unit controls the motion of the transceiver assembly, either locally or remotely. In particular, Javitt et al. discloses that the transceiver assemblies may be rotated, moved up or down, or that an elevation angle thereof may be adjusted.

Another potential drawback of FSO systems is that the optical wavefronts being transmitted from the transceivers are subject to atmospheric distortion, such as from heat rising from the earth, etc. To compensate for such distortion, some systems have begun to use adaptive optics which can restore a wavefront to its original shape. By way of example, such adaptive optics may include a deformable mirror that can be selectively deformed to reshape an optical wavefront.

One exemplary prior art deformable mirror is disclosed in U.S. Pat. No. 6,464,364 to Graves et al. The mirror is capable of controlled deformation by applying electrical voltages to electrode segments on the back of the mirror. Two plates of an electro-restrictive material, such as lead zirconate titanate (PZT) or lead magnesium niobate (PMN), are jointed together with at least one conductive layer sandwiched therebetween. One plate has an outer conductive layer and a mirrored surface on the outer conductive layer. The other plate has a pattern of a plurality of electrode segments on the outer surface. Each electrode segment has a separate electrical terminal for applying a variable electrical voltage thereto for separately transmitting a variable current through each electrode segment and through at least the other plate. This causes variable expansion of the plate to selectively deform that plate and, in turn, the deformable curvature mirror.

While adaptive optics do provide enhanced reliability, they are typically fairly expensive to implement. Moreover, a relatively large power supply on the order of several hundred volts may be required for such devices. Such high voltages are needed to provide deformation of the mirror over its entire deformation range. As such, with the requisite power and control circuitry required for the deformable mirror, an FSO system incorporating such technology can be fairly large and cumbersome to move and set up. Moreover, to provide optical communications over a wide range of distances, most optical transceivers include a telescopic zoom lens device that has a fairly large aspect ratio. Yet, this may also increase the cost of the transceiver assembly, in addition to increasing its overall size.

SUMMARY OF THE INVENTION

In view of the foregoing background, it is therefore an object of the present invention to provide an FSO communications device that is relatively easy to transport and align with other FSO communications devices.

This and other objects, features, and advantages in accordance with the present invention are provided by a modular free space optical (FSO) communications device which may include an optical relay (OR) module and a base module. More particularly, the OR module may include an OR housing and at least one OR device carried thereby. Further, the base module may include a base housing and at least one positioner carried thereby for providing relative movement between the base module and the OR module for optical beam aiming. The modular FSO communications device may also include a camera and a remote station interface connected to the at least one positioner for permitting remote optical beam aiming. Furthermore, the remote station interface may also be connected to the camera for permitting remote viewing.

By way of example, the remote station interface may include an optical fiber interface. The remote station interface may also be an Internet remote station interface. Thus, for example, an operator could connect to the modular FSO communications device via the Internet and view substantially real-time images from the camera. This allows the operator to remotely search for and aim the OR module at another FSO device. Of course, the camera could also be used for surveillance purposes, if desired, or to determine if an obstacle is blocking the line of sight of the modular FSO communications device, for example.

To this end, the modular FSO communications device may further include at least one camera positioner for permitting remote control of the camera. Accordingly, the camera could be moved to view an object without moving the OR module out of alignment with a corresponding FSO device. Also, the base module may further include a controller connected between the remote station interface and the at least one positioner.

The at least one OR device may include a fixed telescopic lens device. Accordingly, the modular FSO communications device may advantageously be relatively small compared to prior art devices. That is, rather than using a relatively large telescopic zoom lens with a large aspect ratio to cover an extended viewing, different OR modules may be used for different applications based upon the requisite focal length for a given application.

The OR housing may have an aperture therein, and it may further include a steering mirror in the optical path between the aperture and the fixed telescopic lens device. Further, the modular FSO communications device may also include an adaptive optics module connected between the base module and the OR module.

Another aspect of the invention is for an FSO communications system. More particularly, the FSO communications system may include first and second modular FSO devices, such as the one described briefly above, aligned for optical communication therebetween.

A free space optical communications method in accordance with the invention may include providing a modular FSO communications device, such as the one described briefly above. The method may further include interfacing the camera with a remote station for permitting remote viewing.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
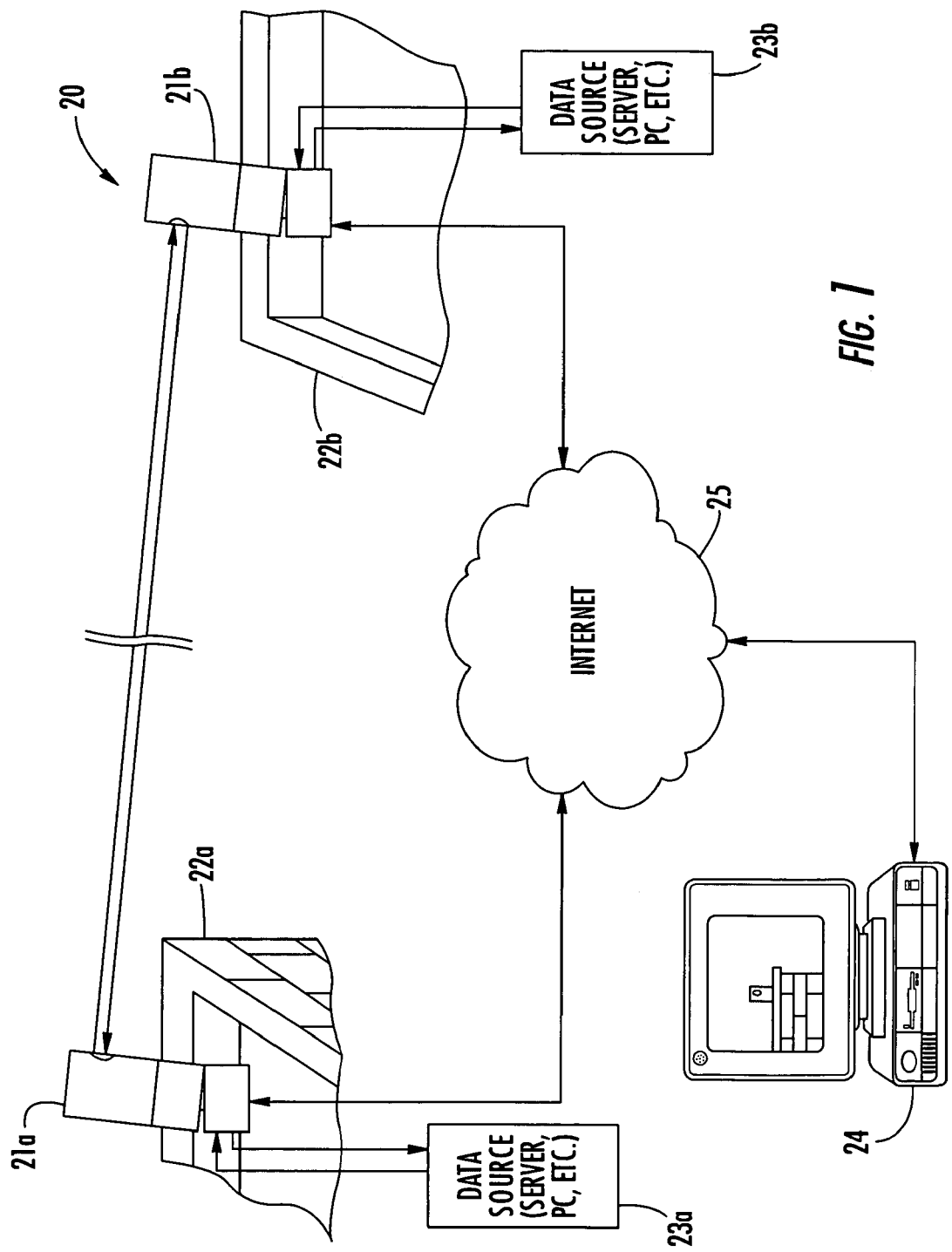
FIG. 1 is a schematic diagram of a free space optical (FSO) communications system in accordance with the present invention.
Figure 2:
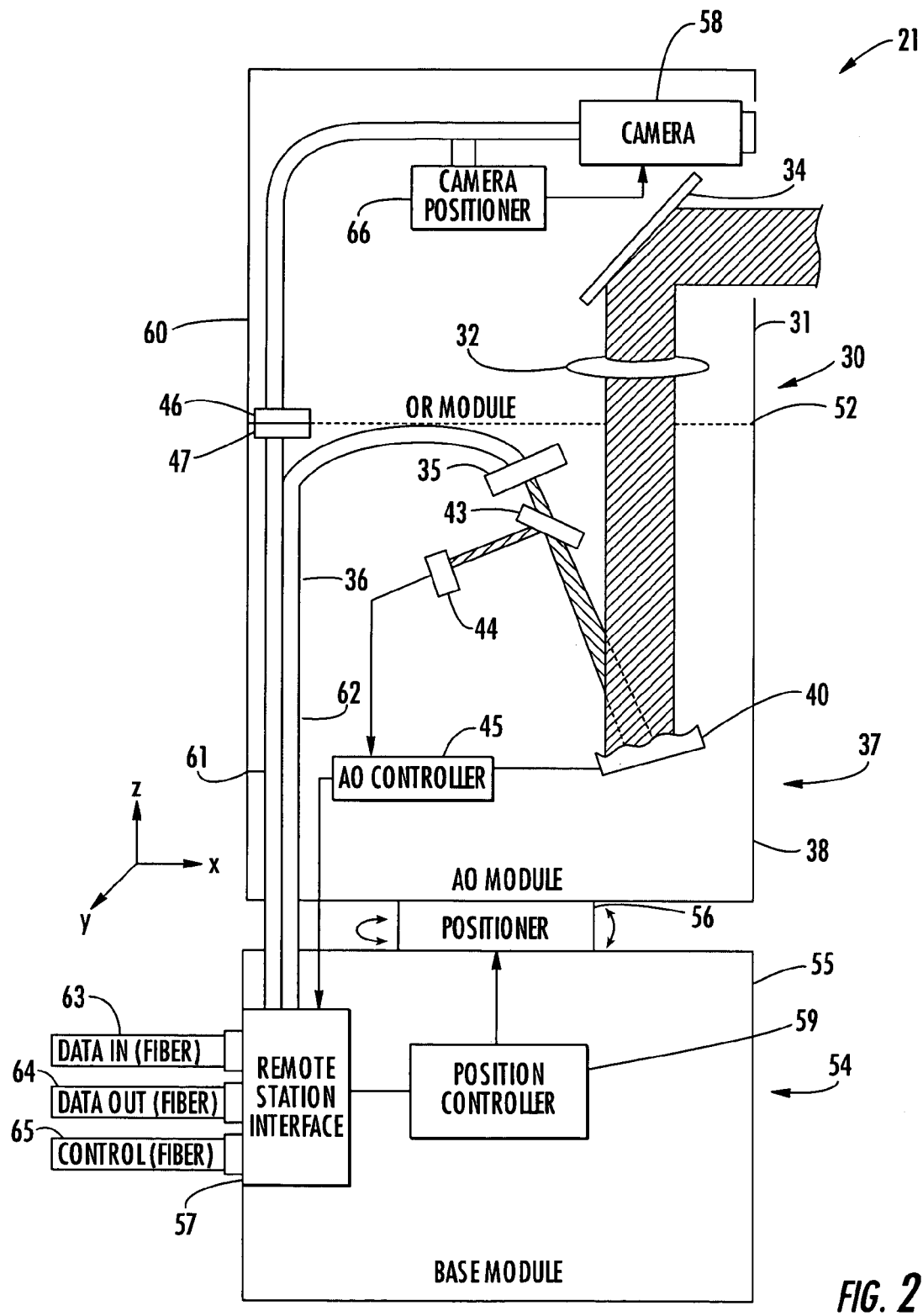
FIG. 2 is side view of a modular FSO communications device of the FSO communications system of FIG. 1 illustrating the various components thereof.
Figure 3:
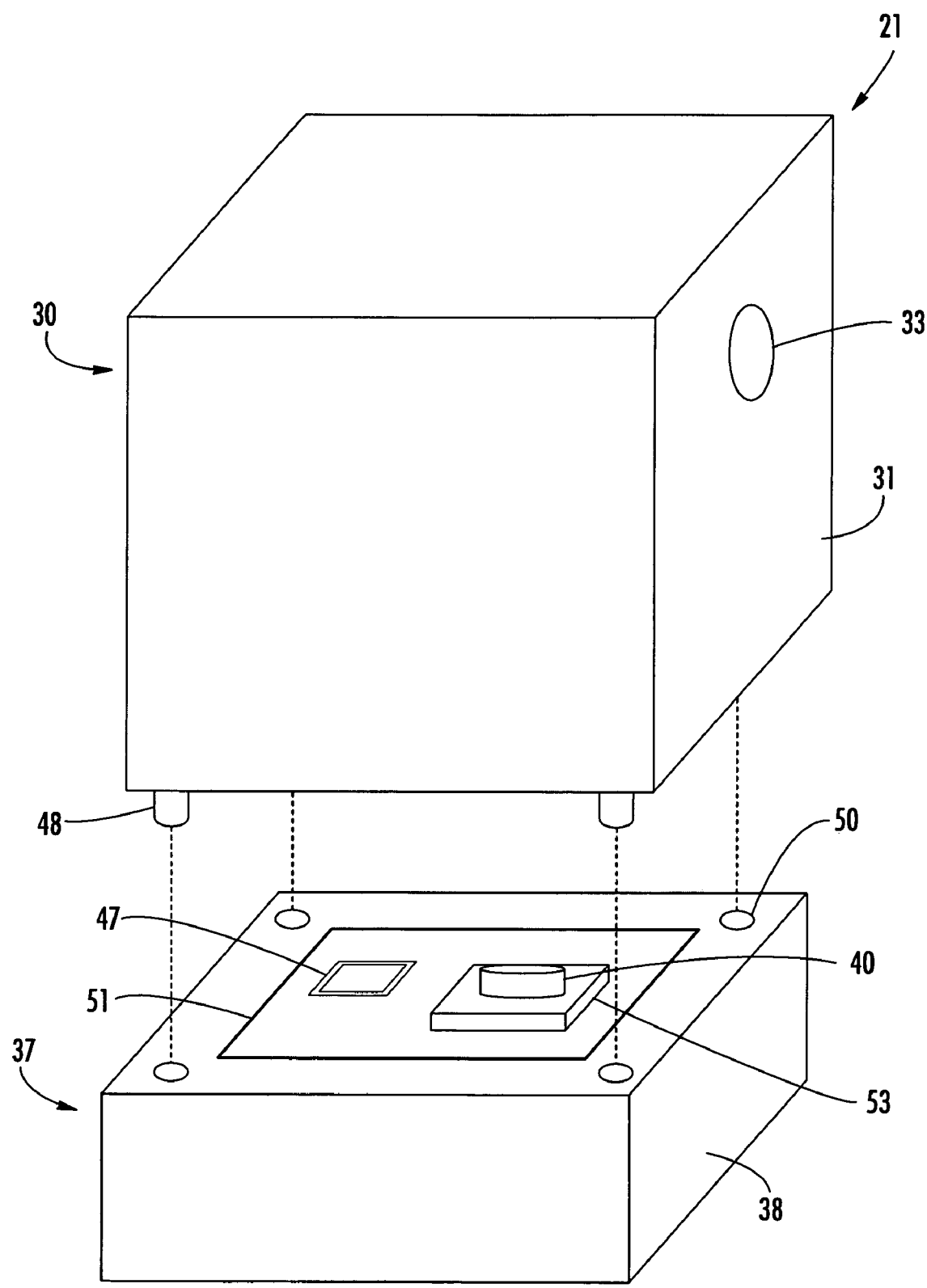
FIG. 3 is perspective view illustrating the interchangeable connection of the adaptive optics (AO) and optical relay (OR) modules of the modular FSO communications device of FIG. 2.

Referring initially to FIGS. 1 through 3, a free space optical (FSO) communications system 20 includes first and second modular FSO communications devices 21a, 21b aligned for optical communication therebetween. In the illustrated example, the FSO communications devices 21a, 21b are positioned on rooftops of buildings 22a, 22b, and each is connected to a respective data source 23a, 23b (e.g., a server or personal computer). That is, the modular FSO communications devices 21a, 21b allow the data sources 23a, 23b to exchange data using optical transmissions, as will be appreciated by those skilled in the art.

To this end, each modular FSO communications device 21 illustratively includes an interchangeable optical relay (OR) module 30. More particularly, the interchangeable OR module 30 illustratively includes an OR housing 31 and one or more OR devices carried thereby. In particular, a fixed lens device 32 is positioned in an optical path within the OR housing 31. The fixed telescopic lens device 32 provides a predetermined focal length range for optical communications, as will be discussed further below. The fixed lens device 32 may include one or more fixed lenses, for example. The OR module 30 may provide optical communications at a frequency of 1550 nm, for example, although other suitable frequencies may also be used.

The OR housing 31 has an aperture 33 defined therein which allows the optical signals to enter and exit the modular FSO communications device 21. A steering mirror 34 is positioned in an optical path between the aperture 33 and the fixed lens device 32, which directs light into and out of the OR housing 31. Furthermore, an optical fiber interface 35 is also positioned in the optical path. The optical fiber interface 35 translates the optical communications signals between a fiber optic cable 36 and the optical path.

The OR module 30 is interchangeably connectable to an adaptive optics (AO) module 37, which illustratively includes an AO housing and one or more AO devices carried thereby. In the illustrated example, the AO device is a deformable mirror 40. As will be appreciated by those skilled in the art, the deformable mirror 40 includes a reflective deformable member or surface 41 (FIG. 5) mounted on an array of actuators 42, each of which operates based upon a supplied voltage. By way of example, the actuators 42 may be piezoelectric elements, although other suitable actuators may also be used.

Accordingly, the reflective deformable member 41 may be selectively deformed by the actuators 42 to correct distortions caused by atmospheric conditions, such as heat rising off the earth, etc., based upon feedback from the optical path. The distorted optical wavefronts are illustrated with wavy hatching in FIG. 1, while the corrected or undistorted wavefronts are indicated by straight hatching. It should also be noted that the deformable mirror 40 may be used not only to correct distortions in received signals, but also to distort transmitted signals so that they are received properly at the target FSO device. An exemplary deformable mirror 40 which may be used in accordance with the present invention is disclosed in the above-noted U.S. Pat. No. 6,464,364, which is hereby incorporated herein in its entirety by reference. Of course, other suitable deformable mirrors or adaptive optics devices may be used as well.

More particularly, to provide the requisite feedback for adjusting the deformable mirror 40, a beam splitter 43 is positioned in the optical path within the AO housing 38. Furthermore, a wavefront sensor 44 is positioned downstream from the beam splitter 43. The wavefront sensor 44 is connected to an AO controller 45. The feedback provided by the wavefront sensor 44 to the AO controller 45 is used to drive the actuators 42 to appropriately adjust the reflective deformable member 41 for correcting detected signal distortion.

Connectors 46, 47 may be used to facilitate signal/power interconnections between the OR module 30 and AO module 37. More particularly, the connectors 46, 47 thus facilitate a relatively quick and easy interchange of the OR module 30 with the AO module 37, as will be appreciated by those skilled in the art. As may be seen in FIG. 3, the interchangeable connection of the OR module 30 to the AO module 37 may be facilitated by guide pins 48 carried by the OR housing 30 which are inserted into corresponding alignment holes 50 defined in the AO housing 37.

The guide pins and corresponding alignment holes 50 ensure that the deformable mirror 40 is in the optical path and properly aligned with the fixed lens device 32 upon connection of the OR module 30 to the AO module 37. Of course, it should be noted that the guide pins 48 could be carried by the AO housing 38, or that other suitable guides may also be used. A seal 51 may also be included for sealing the joint 52 between the OR housing 30 and the AO housing 37, as will be appreciated by those skilled in the art. Of course, it should be noted that releasable fasteners (not shown) may be included as needed in certain applications to securely hold the OR housing 30 to the AO housing 37, as will also be appreciated by those skilled in the art.

It should also be noted that the deformable mirror 40 is schematically shown as being within the AO housing 38 in FIG. 2 for clarity of illustration. However, the deformable mirror will need to have an unobstructed line of sight to the fixed lens device 32, and thus may be carried by a mount 53 on top of the AO housing. Of course, the deformable mirror 40 could be recessed within the AO housing 38, if desired, so long as it is still within the optical path upon connection of the OR module 30 with the AO module 37.

The modular FSO communications device 21 also illustratively includes a base module 54 connected to the AO module 37 for providing relative movement between the base module and the OR module 30 for optical beam aiming. More particularly, the base module 54 illustratively includes a base housing 55, one or more positioners 56 carried thereby, and a position controller 59 for controlling the positioner(s). The positioner 56 preferably allows rotation of the AO module 37 and connected OR module 30 about the illustrated z-axis (i.e., in a horizontal x-y plane). To provide full 360° rotation yet avoid wrapping the various cables which connect the base module 54 and AO module 37, in some embodiments the positioner 56 may be set to limit such rotation to about 390°, for example.

The positioner 56 may also allow the OR module 30 to be inclined at a desired angle so that it may be aimed at targets at lower or higher relative elevations, as will be appreciated by those skilled in the art. By way of example, the position 56 may be a gimbal or a wobble plate, although other suitable positioners may also be used.

As noted above, the fixed lens device 32 provides a predetermined focal length range. In accordance with the invention, different interchangeable OR modules 30 advantageously have different focal length ranges. That is, rather than using a single OR device having a zoom lens with a large aspect ratio as in prior art devices, different interchangeable OR modules 30 may be used based upon the requisite focal length for a given application. Accordingly, the use of larger telescopic lens devices may be avoided, which not only provides an overall size reduction, but it also reduces manufacturing costs.

Moreover, because the OR modules 30 are interchangeable, a customer may use the same AO module 37 for numerous applications. This is important because an AO assembly can be relatively expensive to implement. As such, once a customer has made the initial investment in the module FSO communications device 21, he need only purchase additional interchangeable OR modules 30 if he wants to use the device for applications with different focal length ranges. Further, the inclusion of the AO module 37 allows the modular FSO communications device 21 to be used for wave division multiplexing (WDM), as will be appreciated by those skilled in the art.

In addition, use of the base module 54 providing relative positioning between itself and the AO module not only allows the AO/OR modules 37, 30 to be relatively easily aligned and re-positioned, but it also allows the OR module to have a reduced size. That is, certain prior art FSO terminals, such as the AO-5000 FSO terminal from AOptix Technologies, Inc., require a movable steering mirror to ensure that the optical communications signals are properly steered along the optical path.

In contrast, because the base module 54 moves the OR module 30, the steering mirror 34 may advantageously be fixed. That is, the positioner 56 moves the OR module 30 so that the steering mirror 34 provides the appropriate alignment, rather than having to independently move the steering mirror. To this end, the AO controller 45 may determine a misalignment in the optical path and cause the position controller 59 to reposition the OR module 30 accordingly, as will be appreciated by those skilled in the art. As a result, the steering mirror 34 advantageously need not include its own positioner and control circuitry, which allows the interchangeable OR module 30 to be more compact.

The base module 54 also illustratively includes a remote station interface 57 connected to the position controller 59 for permitting remote control thereof. More particularly, the remote station interface 57 may provide an optical fiber interface for data in/out fiber optic cables 63, 64, respectively, as well as for a control fiber optic cable 65. The control fiber optic cable 65 may be used for sending position control signals to the position controller 56, as well as receiving images from a camera 58 and providing position control signals to a camera positioner 66, which are discussed further below. The remote station interface 57 may include the appropriate optical amplifiers (e.g., erbium amplifiers) to facilitate optical signal communications, as will be appreciated by those skilled in the art.

By way of example, remote station interface may also be an Internet or other network (e.g., LAN, WAN, etc.) remote station interface. As such, the modular FSO communications terminal may advantageously be aligned and re-aligned from a remote terminal 24, such as via the Internet 25, for example, without having to travel to the installation site. Thus, for example, an operator at the remote terminal could remotely reposition the modular FSO communications devices 21a, 21b relatively quickly and easily to communicate with other FSO devices as needed, and all from a single, central location. By way of example, each of the modular FSO communications devices 21a, 21b could be assigned independent Internet IP addresses so that they are independently addressable. Of course, various mediums/networks than the Internet may be used for connecting the remote terminal 24 to the modular FSO communications devices 21a, 21b (e.g., a wireless RF link, etc.), as will be appreciated by those skilled in the art.

As noted above, the modular FSO communications device 21 may also advantageously include a camera 58 carried by the interchangeable OR module 30. It should be noted that while the camera 58 is shown as being mounted within the OR housing 31 in FIG. 2, the camera could also be mounted elsewhere, such as externally to the OR housing or in/on the AO housing 38, for example. A fiber optic cable 60 may be used to connect the camera 58 to the remote station interface via the connectors 46, 47 and another fiber optic cable 61. Of course, an electrical interface may be used as well in some embodiments, if desired, as will be appreciated by those skilled in the art. Similarly, a fiber optic cable 62 may also be used to connect the cable 36 to the remote station interface 57. Of course, the holes through which the various cables enter the AO module 37 and base module 54 may be appropriately sealed to prevent damage from moisture, etc.

It will therefore be appreciated that the modular FSO communications device 21 thus includes a completely optical signal path from the remote station interface 57 to the optical fiber interface 35. As such, the need for optical to electrical conversion circuitry used in certain prior art devices may advantageously be avoided, which may provide further space and cost savings.

One particularly advantageous use for the camera 58 is to provide remote viewing of a target FSO device for remote optical beam aiming, as shown on the screen of the remote terminal 24 in FIG. 1. Thus, for example, an operator may connect to the modular FSO communications device 21 via the Internet 25 and view substantially real-time images from the camera 58, which allows him to remotely search for and aim the OR module at another FSO device. Of course, the camera 58 may also be used for surveillance purposes, if desired, or to determine if an obstacle is blocking the line of sight of the modular FSO communications device 21, for example.

To this end, the modular FSO communications device 21 may optionally include one or more camera positioners 66, as briefly noted above. Accordingly, the camera 58 may therefore be remotely aimed similar to the OR module 30, but independently thereof. Thus, the camera 58 may be moved to view an object without moving the OR module 30 out of alignment. The camera positioner 66 may receive its position control signals via the same fiber optic cable 60 connected to the camera 58, for example, or via a separate connection. The camera positioner 66 may be located within the OR housing 31, as illustratively shown, or elsewhere.

Figure 4:
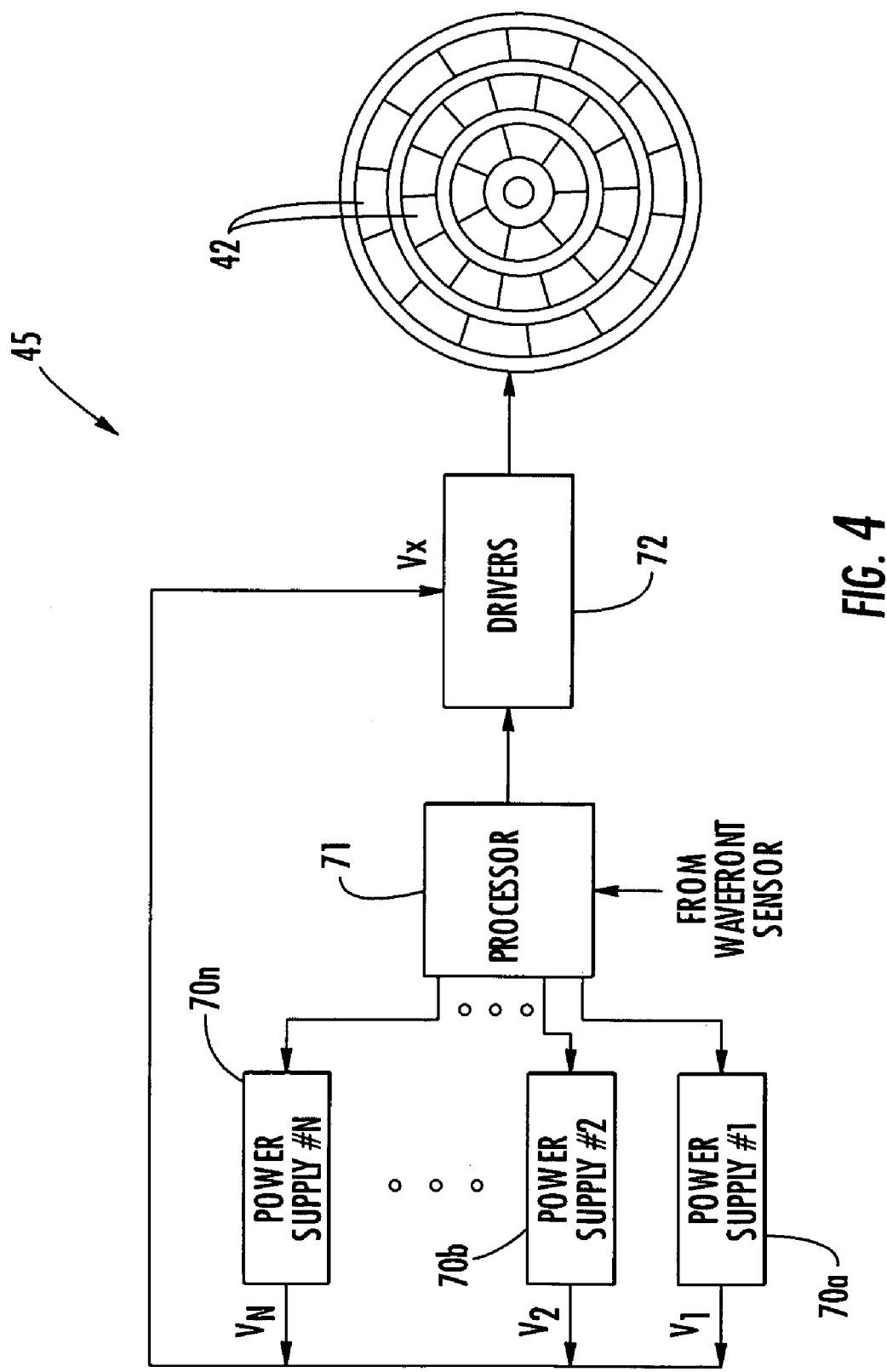
FIG. 4 is a schematic block diagram illustrating the AO controller of FIG. 2 in greater detail.

Turning now additionally to FIG. 4, the AO controller 45 may advantageously provide significant power savings with respect to prior art FSO devices, such as the AOptix device noted above. More particularly, the AO controller 45 may include a plurality of power supplies 70a–70n providing different respective output voltages $V_1-V_N$. The AO controller 45 also illustratively includes a processor 71 and actuator drivers 72. Based upon the feedback information provided from the wavefront sensor 44, as described above, the processor 71 causes the drivers 72 to selectively drive the array of actuators 42 using a desired one of the power supplies 70a–70n to conserve electrical power.

More particularly, the processor 71 selects the appropriate one of the power supplies 70a–70n that provides the minimum voltage $V_X$ needed to correct distortion in the optical wavefront received and/or transmitted by the OR module 30. That is, in many circumstances the actuators 42 will not require the maximum available voltage to correct the distortion, but one or more actuators will require a higher voltage than the rest. By selecting the appropriate one of the power supplies 70a–70n that provides the minimum voltage $V_X$ appropriate for this actuator, the entire array of actuators need not be supplied with the maximum available voltage all of the time, as in prior art devices.

Because of its reduced power consumption, the modular FSO communications device 21 may be sufficiently powered using only a battery source in some applications, as opposed to certain prior art systems which require a direct connection to a high voltage source. By way of example, it is estimated that using the above-described power conservation arrangement may provide power consumptions on the order of about 15 Watts or less in some applications.

Figure 5:
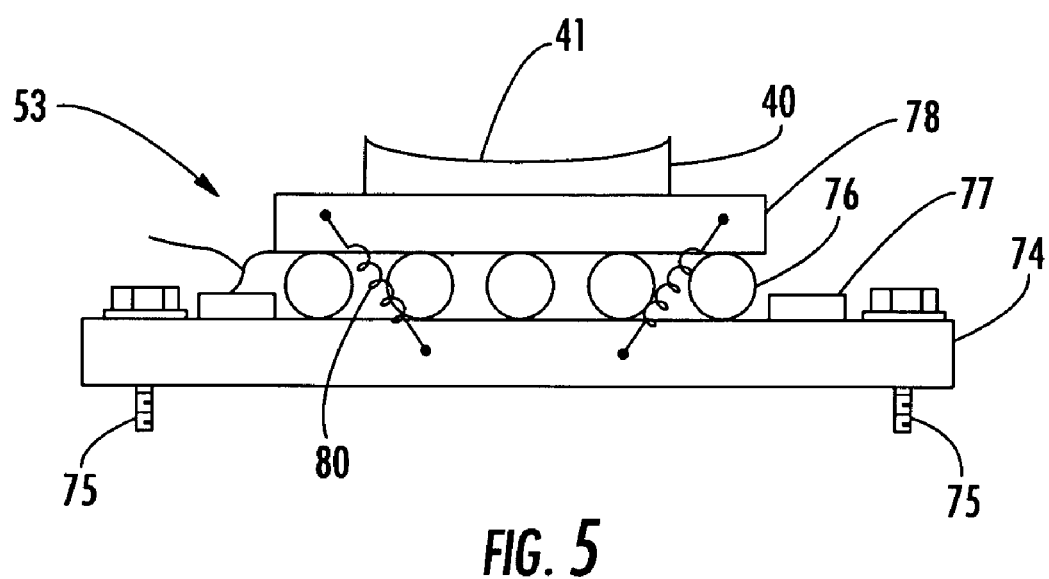
FIG. 5 is a side view illustrating in greater detail the thermal stress isolation mount for the AO device of FIG. 3.

Referring now additionally to FIG. 5, the AO module may optionally include a thermal stress isolation mount 53 connecting the deformable mirror 40 to the AO housing 38 (FIG. 3). More particularly, the thermal stress isolation mount 53 may include a bottom mounting plate 74 to be connected to the AO housing 38, such as by fasteners 75 (e.g., screws or bolts). A plurality of spherical bearings 76 are positioned on the bottom mounting plate 74 between stops 77.

Further, a top mounting plate 78 is positioned on the spherical bearings 76 and connected to the bottom mounting plate 74 via elastic members 80 (e.g., springs). The deformable mirror 40 is carried by the top mounting plate 78. Accordingly, thermo-elastic stresses experienced by the mounting plate 74 due to harsh environmental conditions, for example, are substantially isolated from the deformable mirror 40 to enhance its reliability and longevity, as will be appreciated by those skilled in the art. Of course, other mounting arrangements known to those skilled in the art may also be used.

As a result of the above-noted space saving features of the present invention, it is estimated that the height of the modular FSO communications device 21 may be less than about two feet, for example, in some applications. Moreover, it is also estimated that a width and depth of the modular FSO communications device 21 may be less than about one foot, for example. At such dimensions, the modular FSO communications device 21 may be relatively easily transported by a single person. It is thus well suited for installations at remote sites where it may otherwise be difficult to use heavy lifting equipment to help set up and transport a large FSO device, or where space is limited. Of course, the modular FSO communications device 21 may be made larger as well.

Transportability is further enhanced by the power saving features of the invention discussed above, which may advantageously allow the modular FSO communications device 21 to be operated using battery power in certain applications. In some embodiments, optical folding may also be used if desired to further decrease the optical path length, and thus the size of the OR module. Hybrid circuitry may also be used to decrease overall device size, as will be appreciated by those skilled in the art.

Moreover, while the modular FSO communications devices 21a, 21b are shown in a fixed arrangement in FIG. 1, it should be noted that the modular FSO communications device in accordance with the present invention may advantageously be used to communicate with moving objects, such as an aircraft or satellite, for example. That is, the positioning ability of the modular FSO communications device 21 would allow it to track a moving target using an appropriate tracking device (e.g., GPS and/or other navigational devices carried by the moving object). This may provide a significant cost savings for satellite communications systems, for example, since a large portion of the cost of many satellites comes from the RF conversion and processing circuitry required to processes RF signal latencies, etc.

To this end, a plurality of the modular FSO communications devices 21 could be remotely positioned from one another and connected via a network (e.g., the Internet) to track a satellite, for example. As such, when one of the modular FSO communications devices 21 loses its line of site to the satellite, another one having a clear line of sight could then communicate with the satellite. One particularly advantageous approach for performing such FSO satellite communications is disclosed in the application entitled SYSTEM AND METHOD OF FREE-SPACE OPTICAL SATELLITE COMMUNICATIONS, attorney docket number GCSD-1407 (51329), which is hereby incorporated in its entirety by reference. Of course, other applications for the modular FSO communications device 21 of the present invention will be readily apparent to those skilled in the art.

It should be noted that for satellite communications, the collection area for the OR device may need to be larger than in ground applications where the modular FSO communications devices are within a few miles of one another. Nonetheless, it is estimated that a collection area of about one square foot may be sufficient for many satellite communication applications, which will still allow the modular FSO communications device 21 to be more compact than many current FSO devices which are only intended for use over a few miles.

An FSO communications method aspect of the invention includes providing an adaptive optics (AO) module 37 including an AO housing 38 and at least one AO device 40 carried thereby. The method may further include selecting one of a plurality of interchangeable optical relay (OR) modules 30 based upon a desired focal length range. More particularly, each OR module 30 may include an OR housing 31 and at least one OR device 32 carried thereby, and each at least one OR device of a given OR module may provide a predetermined focal length range from among different focal length ranges for respective OR modules. The method may further include interchangeably connecting the OR module 30 and the AO module 37 to establish an optical path between the at least one OR device and the at least one AO device, as previously described above.

Yet another FSO communications method in accordance with the invention may include providing a modular FSO communications device 21, as described above. The method may further include interfacing the camera 58 with a remote station 24 for permitting remote viewing, as also described briefly above.

Still another method aspect of the invention is for conserving power in an FSO communications device, such as the device 21 described above. In particular, the method may include providing a plurality of power supplies 70a–70n providing different respective output voltages, and selectively driving an array of actuators 42 for a deformable mirror 40 using a desired one of the power supplies to conserve electrical power, as also described above. Further method aspects of the invention will be readily apparent to those skilled in the art based upon the foregoing discussion and will therefore not be discussed further herein.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A modular free space optical (FSO) communications device comprising:
   an optical relay (OR) module comprising an OR housing and at least one OR device carried thereby;
   a base module comprising a base housing and at least one positioner carried thereby for providing relative movement between said base module and said OR module for optical beam aiming;
   a camera;
   a remote station interface connected to said at least one positioner for permitting remote optical beam aiming, said remote station also connected to said camera for permitting remote viewing; and
   at least one camera positioner for permitting remote control of said camera.

2. The modular FSO communications device of claim 1 wherein said remote station interface comprises an optical fiber interface.

3. The modular FSO communications device of claim 1 wherein said remote station interface comprises an Internet remote station interface.

4. The modular FSO communications device of claim 1 wherein said base module further comprises a controller connected between said remote station interface and said at least one positioner.

5. The modular FSO communications device of claim 1 wherein said at least one OR device comprises a fixed telescopic lens device.

6. The modular FSO communications device of claim 5 wherein said OR housing has an aperture therein; and further comprising a steering mirror in the optical path between the aperture and said fixed telescopic lens device.

7. The modular FSO communications device of claim 1 further comprising an adaptive optics module connected between said base module and said OR module.

8. A modular free space optical (FSO) communications device comprising:
   an optical relay (OR) module comprising an OR housing and at least one OR device carried thereby;
   a base module comprising a base housing and at least one positioner carried thereby for providing relative movement between said base module and said OR module for optical beam aiming;
   a camera;
   a remote station interface connected to said camera for permitting remote viewing; and
   at least one camera positioner for permitting remote control of said camera.

9. The modular FSO communications device of claim 8 wherein said remote station interface comprises an optical fiber interface.

10. The modular FSO communications device of claim 8 wherein said remote station interface comprises an Internet remote station interface.

11. The modular FSO communications device of claim 8 wherein said base module further comprises a controller connected between said remote station interface and said at least one positioner.

12. The modular FSO communications device of claim 8 wherein said at least one OR device comprises a fixed telescopic lens device.

13. The modular FSO communications device of claim 12 wherein said OR housing has an aperture therein; and further comprising a steering mirror in the optical path between the aperture and said fixed telescopic lens device.

14. The modular FSO communications device of claim 8 further comprising an adaptive optics module connected between said base module and said OR module.

15. A free space optical (FSO) communications system comprising:
   first and second modular FSO communications devices aligned for optical communication therebetween, each comprising
      an optical relay (OR) module comprising an OR housing and at least one OR device carried thereby,
      a base module comprising a base housing and at least one positioner carried thereby for providing relative movement between said base module and said OR module for optical beam aiming,
      a camera,
      a remote station interface connected to said at least one positioner for permitting remote optical beam aiming, said remote station also connected to said camera for permitting remote viewing; and at least one camera positioner for permitting remote control of said camera.

16. The FSO communications system of claim 15 further comprising a remote terminal connected to said remote station interfaces of said first and second modular FSO devices.

17. The FSO communications system of claim 15 wherein said remote station interface comprises an optical fiber interface.

18. The FSO communications system of claim 15 wherein said remote station interface comprises an Internet remote station interface.

19. The FSO communications system of claim 15 wherein said base module further comprises a controller connected between said remote station interface and said at least one positioner.

20. The FSO communications system of claim 15 wherein said at least one OR device comprises a fixed telescopic lens device.

21. The FSO communications system of claim 20 wherein said OR housing has an aperture therein; and wherein each of said first and second modular FSO communications devices further comprises a steering mirror in the optical path between the aperture and said fixed telescopic lens device.

22. The FSO communications system of claim 15 wherein each of said first and second modular FSO communications devices further comprises an adaptive optics module connected between said base module and said OR module.

23. A free space optical (FSO) communications system comprising:
    first and second modular FSO communications devices aligned for optical communication therebetween, each comprising
        an optical relay (OR) module comprising an OR housing and at least one OR device carried thereby,
        a base module comprising a base housing and at least one positioner carried thereby for providing relative movement between said base module and said OR module for optical beam aiming,
        a camera,
        a remote station interface connected to said camera for permitting remote viewing; and
        at least one camera positioner for permitting remote control of said camera.

24. The FSO communications system of claim 23 further comprising a remote terminal connected to said remote station interfaces of said first and second modular FSO devices.

25. The FSO communications system of claim 23 wherein said remote station interface comprises an optical fiber interface.

26. The FSO communications system of claim 23 wherein said remote station interface comprises an Internet remote station interface.

27. The FSO communications system of claim 23 wherein said base module further comprises a controller connected between said remote station interface and said at least one positioner.

28. The FSO communications system of claim 23 wherein said at least one OR device comprises a fixed telescopic lens device.

29. The FSO communications system of claim 28 wherein said OR housing has an aperture therein; and wherein each of said first and second modular FSO communications devices further comprises a steering mirror in the optical path between the aperture and said fixed telescopic lens device.

30. The FSO communications system of claim 23 wherein each of said first and second modular FSO communications devices further comprises an adaptive optics module connected between said base module and said OR module.

31. A free space optical communications method comprising:
    providing a modular free space optical (FSO) communications device comprising an optical relay (OR) module comprising an OR housing and at least one OR device carried thereby, a base module comprising a base housing and at least one positioner carried thereby for providing relative movement between the base module and the OR module for optical beam aiming, end a camera connected to the remote station interface, and at least one camera positioner; and
    interfacing the camera and at least one camera positioner with a remote station for permitting remote viewing and remote control of the camera.

32. The method of claim 31 further comprising interfacing the at least one positioner with the remote station for permitting remote optical beam aiming.

33. The method of claim 31 wherein interfacing comprises interfacing using an optical fiber interface.

34. The method of claim 31 wherein interfacing comprises interfacing via the Internet.

35. The method of claim 31 wherein the at least one OR device comprises a fixed telescopic lens device.

36. The method of claim 31 wherein the modular FSO communications device further comprises an adaptive optics module connected between the base module and the OR module.

* * * * *